June 17, 1958 G. LAUBE ET AL 2,838,975
MEANS FOR MAKING STEREOSCOPIC PICTURES
Filed March 19, 1954 8 Sheets-Sheet 1

Fig. 1.

INVENTORS
GROVER LAUBE
SOL HALPRIN
BY
Lyon & Lyon
ATTORNEYS

June 17, 1958   G. LAUBE ET AL   2,838,975
MEANS FOR MAKING STEREOSCOPIC PICTURES
Filed March 19, 1954   8 Sheets-Sheet 3

INVENTORS
GROVER LAUBE
SOL HALPRIN
BY
Lyon & Lyon
ATTORNEYS

United States Patent Office 2,838,975
Patented June 17, 1958

2,838,975

MEANS FOR MAKING STEREOSCOPIC PICTURES

Grover Laube and Sol Halprin, Los Angeles, Calif., assignors to Twentieth Century Fox Film Corporation, New York, N. Y., a corporation of Delaware Application March 19, 1954, Serial No. 417,392

6 Claims. (Cl. 88—16.6)

The present invention relates to improved means and techniques useful in making stereoscopic motion pictures, involving a novel arrangement of standard motion picture cameras.

The present arrangement contemplates making stereoscopic pictures using two cameras operating simultaneously and in synchronism, with each of such cameras photographing the same scene from slightly different angles. Subsequently, such pictures are conventionally projected simultaneously, using two projectors running in synchronized relationship, the respective pictures which are to be viewed by the viewer's right and left eye being projected through polaroid screens, using conventional techniques, and then reflected from a non-polarized surface on a viewing screen and received through polarizing spectacles worn by the viewer. Using such conventional techniques, the picture intended for the right eye is received by the right eye, and likewise, the left eye receives its intended picture. The right and left eye pictures not intended to be seen by the opposite eyes are blacked out by the effect of the crossed angles of the polarizer on the projector in respect to the polarizer worn by the viewer. The impression of the viewer when looking at such pictures is that he sees the various objects nearer to or farther away from their respective planes, and in this manner, there is produced what is commonly referred to as a stereoscopic or a third-dimensional effect. The boundaries of the composite picture as viewed are "framed" within what is termed the stereo-window, the real plane of the above-mentioned reflecting surface not being apparent to the viewer. As the picture changes from scene to scene or when the cameras move to a closer or farther away position, or when the actors come closer to or go farther away from the cameras, these various positions should be truly represented. Differently stated, when the scenes change or under any other conditions mentioned above, the closer or more distant objects should remain in like position with respect to the screen window, and when actors move toward the camera, they should appear to move from a distant position behind the window to a position coinciding with the plane of the window; or, in a special effect scene, it may be desirable to see the action move through the window and appear in front of the same.

While the two cameras take substantially duplicate pictures of the same scene from two separated viewpoints, displacements occur with similar objects in respect to other similar objects, either nearer to or farther away from the camera, and also when the similar objects in both the pictures assume duplicate positions in both pictures, the superimposed images appear in the plane of the stereo-window.

Proper convergence of the two cameras is considered important. Otherwise, when two cameras are trained on some point within a scene chosen as a point of compromise, such point of compromise is usually more distant or beyond the point of interesting action, with the result that the objects in such interesting action appear too much in front of the screen window, and in effect, the objects or actors in such undesirable condition are performing over the heads of the audience. The reason for this is that there is a physical displacement of like images either forward or back of the point of convergence or that point in the scene on which both cameras are trained, caused by the horizontal parallax of the two spaced viewpoints. Objects closer to the camera than the convergence point are spaced to the left for the right eye view, and the same objects are spaced to the right for the left eye view, thus necessitating ocular convergence by the viewer. The opposite occurs with similar objects more distant than the point of convergence, requiring the viewer to fuse these objects with either parallel or diverging vision. In that respect, either converging and particularly diverging angles that are too great are not comfortable to the viewer and defeat the purpose of creating natural depth.

Another problem involved in producing good three-dimensional pictures is elimination of keystone distortion. When two cameras are mounted side by side and trained on a forward object, it is evident that the two image planes are not parallel, thereby causing keystone distortion to be recorded in a reverse manner in each of the two pictures taken by the respective cameras. Attempts have been made to overcome such distortion by mounting the two cameras facing one another and placing between them two mirrors positioned at 45° angles to the axes of the lenses of the respective cameras. Training of the cameras in such case is done by changing slightly the angle of one or both mirrors. Even so, in such case, it is evident that the disparate images have considerable physical offset because of the greater distance from the image plane, thus effecting convergence.

One feature of the present arrangement involves moving the lenses laterally to effect the training inward on the chosen point of convergence and eliminating keystone distortion by retaining substantial parallelism of the two image planes.

Another problem involved in producing good three-dimensional pictures involves effectively changing the separation of the lenses of the two cameras when their focal lengths are changed. This problem arises from the following considerations. In the making of motion pictures in which action is photographed, the distances to and away from the camera are considered to be much the same regardless of what focal length lenses are used, and as usually stated, action is photographed in a close field relative to the camera. The shorter focal length lenses include wider angles, the longer ones narrower angles with greater image magnitude. For these reasons, and also for the purpose of retaining similar spacing of the disparate images, another important feature of the present invention is that, regardless of lens focal length, the separation of the lenses is effectively reduced when their focal lengths are increased, and as a result, the spacing of the disparate images remains substantially the same when lenses are used of different focal lengths, and the viewer is not encumbered with changes of ocular convergence when observing scenes following one another that have been photographed with lenses of different focal lengths. Thus, when using lenses of the shortest focal length, the separation is slightly greater than average inter-ocular spacing of one's eyes, approximately 2½ inches. When lenses of longer focal lengths are used, the distance of separation is less than this average inter-ocular distance. This is accomplished using a flat plate mounting for the two cameras. The cameras are mounted at right angles to each other. One camera is trained directly at the scene and the other camera, termed the "idiot camera," is trained at a flat mirror which is mounted at an approximate 45° angle to the idiot camera's horizontal axis to direct this camera's view directly at the scene. The mirror is slidably mounted with movement parallel to such one camera directed directly at the scene. Such mirror, although slidably mounted, is indexed into one of a plurality of index positions which are used with pairs of lenses having different focal lengths. The effect of this mirror adjustment serves to increase or reduce the spacing of the two camera lenses. The lenses of the two cameras are mounted so that they may be moved horizontally and parallel to the image plane and are so positioned that, when an object is placed in the scene at a distance representing an average point of convergence, the image of such object appears at a center line of the image field in both cameras.

Also this mirror is pivotally mounted for adjustment both horizontally and vertically so as to register the two images vertically by rotating the mirror on its horizontal axis, and rotation of the mirror on its vertical axis provides means of changing the converging point of training. Such first adjustment involving rotation of the mirror about its horizontal axis is made after proper vertical alignment is attained; and the second adjustment which involves rotation of the mirror about its vertical axis may be changed while photographing a scence in those instances where it is desirable to change the position of convergence for the purpose of placing subject material, attracting the interest of the viewer, in the proper position relative to the screen window.

Another feature of the present arrangement involves a linkage with the lens focusing mechanism such that the converging point of the two cameras is caused to follow and coincide with a point of lens focus, such linkage being particularly useful when the camera is moving closer to or away from the action.

The camera mounting plate also provides room for mounting a straight-through type of camera monitoring view finder, and the mechanism of such view finder is mechanically related with the mechanism for adjusting the focus.

It is, therefore, a general object of the present invention to provide improved means and techniques outlined above, whereby three-dimensional pictures may be produced in an improved manner.

Another object of the present invention is to provide an improved arrangement of the character outlined above.

Another object of the present invention is to provide means whereby separation of lenses of a pair of cameras may be effectively reduced when the focal lengths of such lenses are increased.

Another object of the present invention is to provide an improved arrangement of this character in which keystone distortion is substantially eliminated.

Another object of the present invention is to provide and arrangement of this character wherein the physical displacement of like objects appearing in the two pictures is reduced to a minimum.

Another object of the present invention is to provide an arrangement of this character in which the converging point of two cameras may be conveniently changed.

Another object of the present invention is to provide an arrangement of this character which compactly mounts the two cameras and the associated monitoring view finder.

Another object of the present invention is to provide an arrangement of this character wherein means is provided to obtain correct separation of the two camera lenses.

Another object of the present invention is to provide an arrangement of this character in which the focus controls of the two cameras may be inter-connected and made to work in unism.

Another object of the present invention is to provide an improved arrangement of this character in which two cameras may be mounted compactly and conveniently.

Another object of the present invention is to provide an arrangement of this character in which a mirror is slidably mounted and positioned and indexed to effect correct lens separation for pairs of lenses having different focal lengths.

Another object of the present invention is to provide an improved arrangement of this character in which the lenses of the cameras are movable in respect to their center and the center of the image field.

Another object of the present invention is to provide an improved arrangement of this character in which camera convergence may be either automatically or manually controlled.

Another object of the present invention is to provide an improved arrangement of this character in which the spacing of disparate images may be controlled and reduced in a convenient manner.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 23, 26, 27:
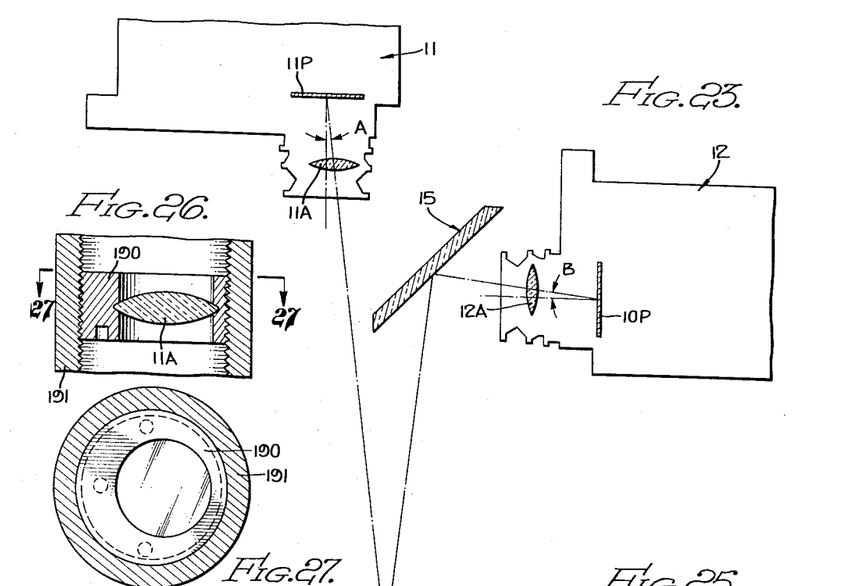
Figure 23 illustrates the off-centered mounting of the lenses in the two cameras for purposes outlined above.
Figure 26 is a transverse section through a camera showing the manner in which the principal axis of the lens system is displaced laterally with respect to the image plane of the corresponding camera.
Figure 27 is a view taken generally on the line 27—27 of Figure 26.

The arrangement comprises generally a suitable mounting base 10 upon which a pair of conventional motion picture cameras 11 and 12 are slidably mounted for movement to one of a plurality of indexed positions, the optical axes of the two cameras 11 and 12 being substantially at right angles to each other although not exactly so as illustrated in Figure 23; and a plane mirror 15 which is also slidably mounted on the base 10 for positioning in different indexed positions. Also, the apparatus includes a manually adjustable lever 85 for adjusting the angular position of the mirror 15; and also a manually adjustable lever 18 for adjusting the lens system of the cameras 11 and 12. Under certain conditions as described above, movement of the lever 18 results in change in focus as well as change in angular position of the mirror 15, i. e., convergence of the system.

Figure 1:
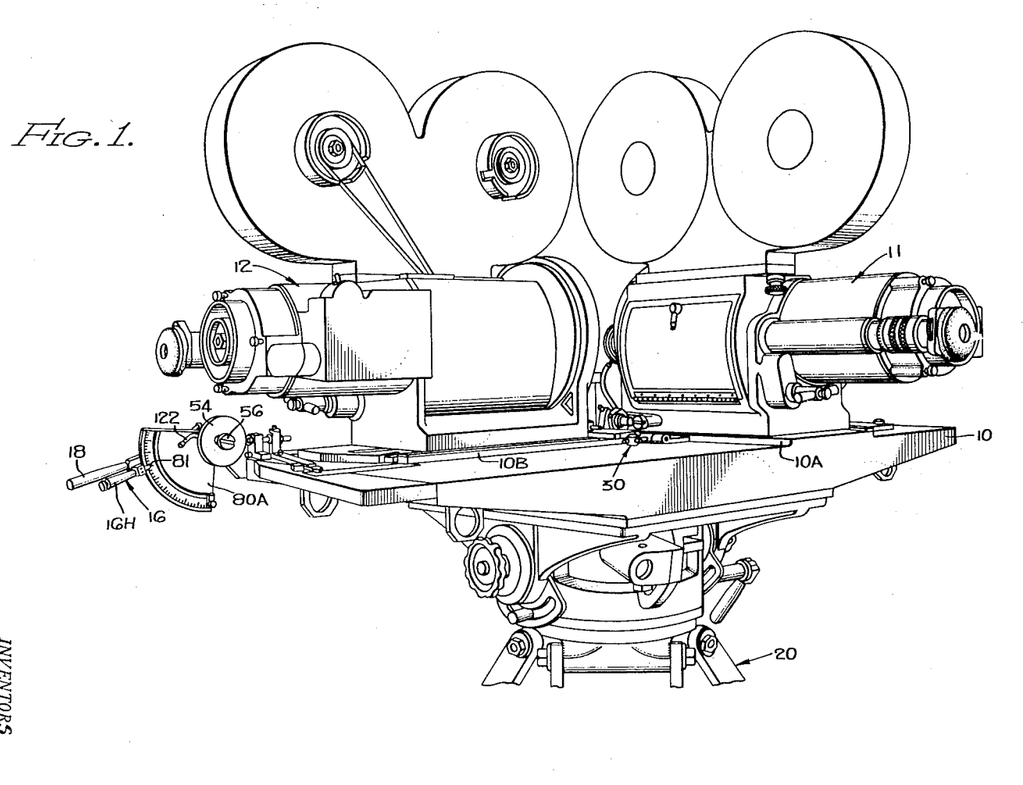
Figure 1 is a perspective view showing a pair of cameras mounted in accordance with features of the present invention for producing three-dimensional pictures on conventional movie film, the view being taken from the rear of the assembly.

More specifically, the base 10, which may be mounted on a suitable support such as for example a tripod 20, has two raised seats 10A and 10B (Figure 1) engageable with the base of the cameras 11 and 12, and a third seat 10C (Figure 17) upon which the mirror support 22 is slidably mounted for positioning in different indexed positions.

Figures 3, 4, 5, 6, 7:
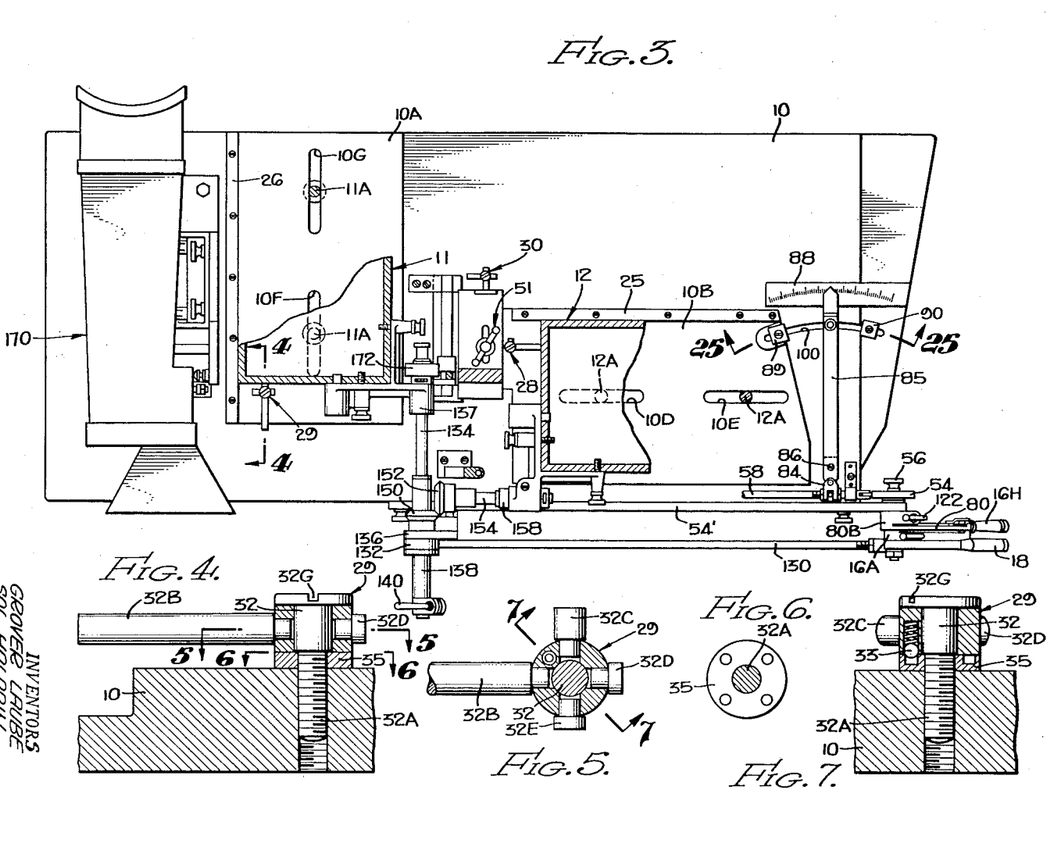
Figure 3 is a view taken generally along the line 3—3 of Figure 2.
Figure 4 is a sectional view taken on the line 4—4 of Figure 3.
Figure 5 and 6 are views taken, respectively, on the lines 5—5 and 6—6 of Figure 4.
Figure 7 is a sectional view taken on the line 7—7 of Figure 5.
Figure 22:
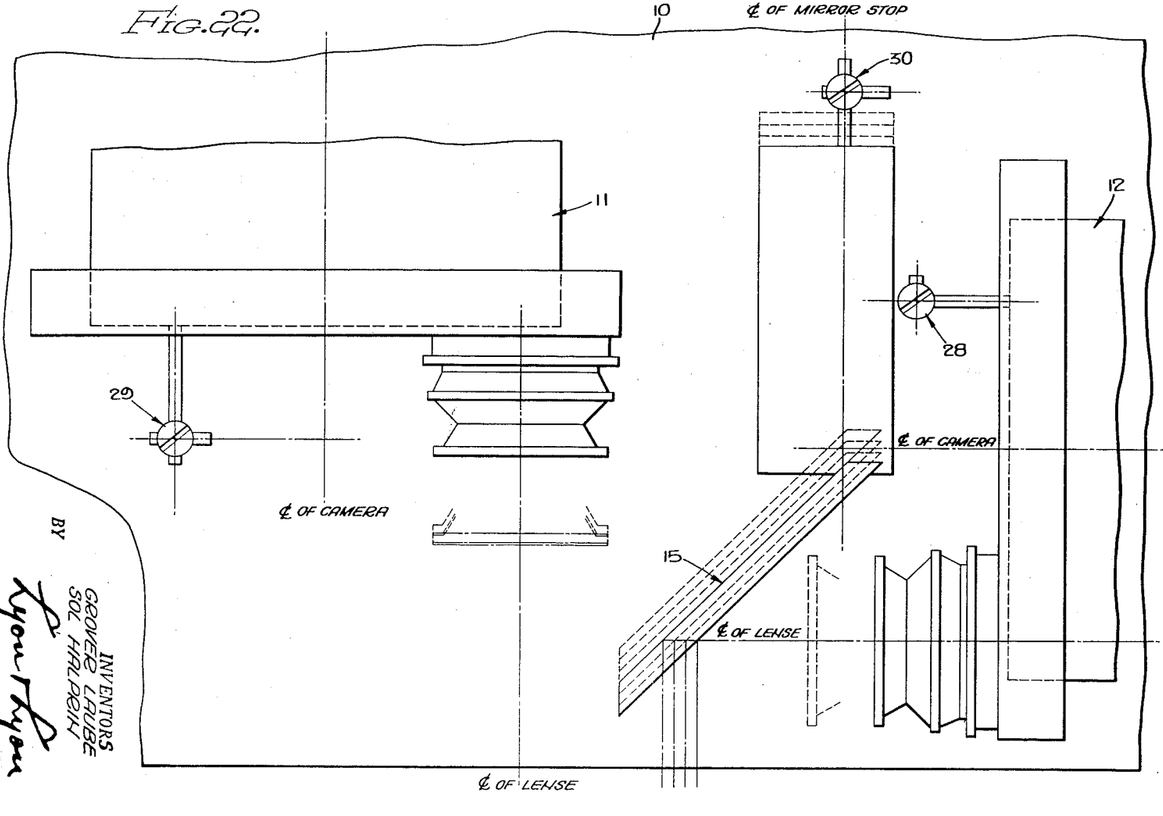
Figure 22 serves to illustrate the structure and operation of the three index stop members for assuring correct positioning of the two cameras and the mirror mounting.

The cameras 11 and 12 are each mounted with their optical axes extending substantially perpendicular and each is slidably mounted on the base 10 for movement in a direction extending substantially parallel with the optical axes of the respective cameras. For purposes of providing such guided slidable movement of the cameras 11 and 12, the supporting seats 10A and 10B, as shown in Figure 3, have longitudinally and centrally disposed grooves within which pins of the cameras 11 and 12 extend. The grooves in the seat 10B have the reference numerals 10D and 10E and the corresponding grooves in the seat 10A have the reference numerals 10F and 10G; the guide pins of camera 11 are designated by the reference numeral 11A and the guide pins of the camera 12 are designated by the reference numeral 12A. In addition, guide bars 25 and 26 are bolted to the supporting plate or base 10 and are engageable with the sides of the cameras 12 and 11, respectively, to assure proper orientation of the optical axes of the respective cameras. The exact positions of the cameras 11 and 12 are established by the adjusted position of the turret stop members 28 and 29, respectively, as shown in Figures 3 and 22, each of such stop turret members 28 and 29 having a plurality of radially extending arms of different lengths serving as stop members, and the construction of such stop turret members 28 and 29 is exemplified by the constructions illustrated in detail in Figures 4, 5, 6 and 7; as is also the construction of the stop turret member 30 which is of the same construction and for the function of indexing the mirror 15 in different adjusted positions.

As illustrated in Figures 4, 5, 6 and 7, the stop turret member 29 comprises a cylindrical member 32 which is integrally formed with a screw-threaded shank 32A engageable with a tapped portion of the base 10. The cylindrical member 32 has four arms 32B, 32C, 32D and 32E of different lengths extending radially therefrom for engagement with the casing of the camera 11. The aforementioned arms are of predetermined lengths so that each arm when in engagement with the casing of camera 11 serves to index the position of the camera in a predetermined position. The cylindrical member 32 may be rotated using a screw driver engageable with a screw driver slot 32G and the turret or cylindrical member 32 is maintained in different adjusted positions by a spring biased ball 33 engageable with one of four apertured portions, as illustrated in Figure 7, in the seat 35 which is stationarily mounted on the base 10.

The mirror support and its adjustment is now described and comprises generally means for slidably mounting the mirror for movement in a direction which extends generally parallel to the optical axis of the camera 11 as well as means for indexing the mirror support in different positions, together with means for adjusting the plane of the mirror 15 both with respect to the vertical plane and with respect to the horizontal plane.

Figures 16, 17, 18, 19, 20, 21:
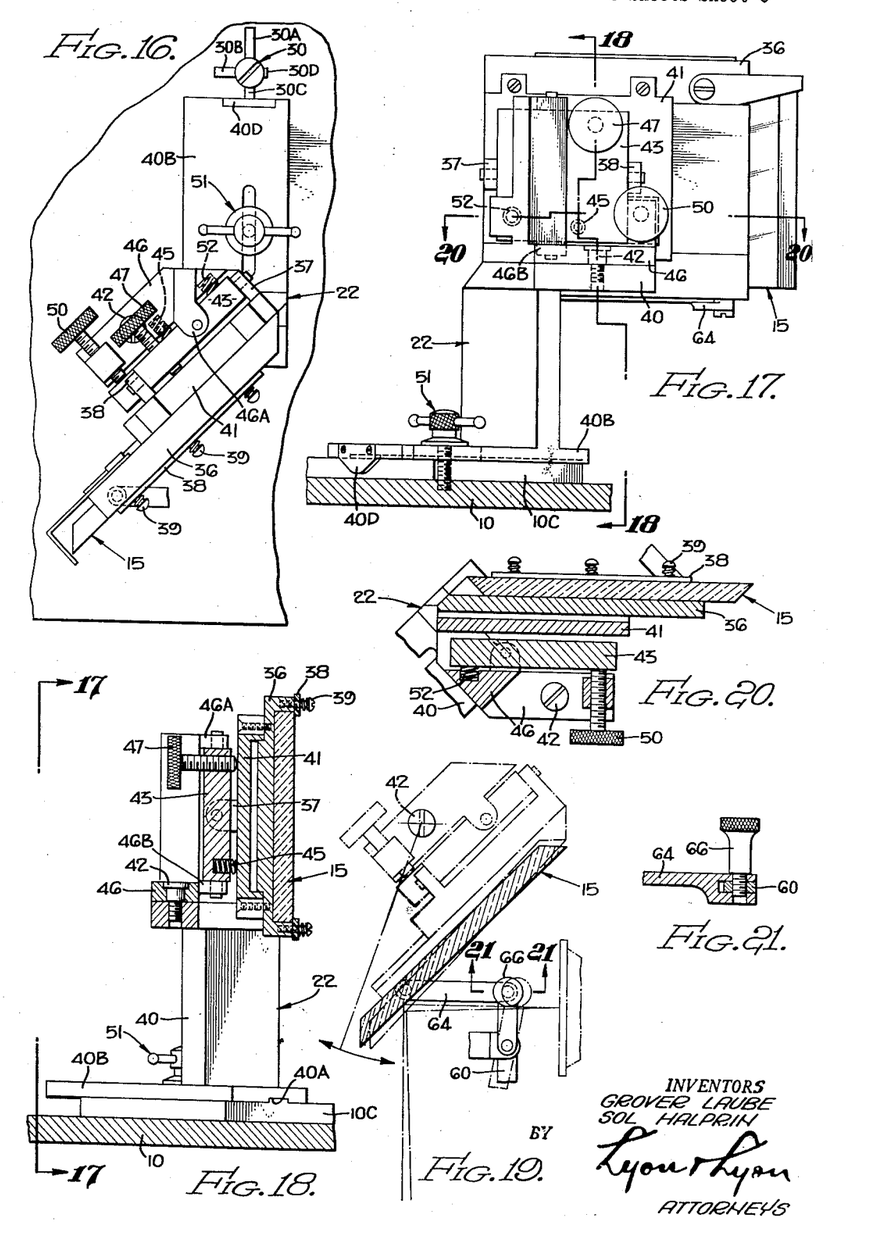
Figure 16 shows in enlarged form details of the mirror mounting which is also illustrated in Figure 8.
Figure 17 is a sectional view taken on the line 17—17 of Figure 18.
Figure 18 is a sectional view taken on the line 18—18 of Figure 17.
Figure 19 is a view similar to Figure 16 for purposes of illustrating the manner in which the mirror may be adjusted.
Figure 20 is a sectional view taken on the line 20—20 of Figure 17.
Figure 21 is a sectional view taken on the line 21—21 of Figure 19.

For these general purposes, as shown in Figure 18, there is provided a vertically extending bracket 40 which has a longitudinally extending groove 40A in its base portion 40B, the walls of the grooved portion being engaged by a projection on the base seat 10C to provide guided movement of the mirror support in a direction which extends substantially parallel to the optical axis of the camera 11. The mirror support is locked in adjusted position by the manually operated locking mechanism 51 to the base 10 after being moved to adjusted position wherein the downwardly extending projection 40D engages one of the stop arms 30A, 30B, 30C or 30D on the turret stop member 30, as the case may be. This lock or clamp 51 may comprise simply a threaded bolt threaded into the base 10 and passing through an apertured portion of the mirror support base 40B with a flange engageable with such base 40B. The upper end of the bracket 40 screw-threadedly receives a pivot pin 42 which serves to pivotally support the element 46 for movement about a horizontal axis. This element 46 in turn has a pair of vertically spaced bearings 46A and 46B which receive shafts extending from the element 43, the element 43 being thus mounted for pivotal movement about a vertical axis, i. e., about the axes of bearings 46A and 46B. This element 43 adjustably supports the mirror 15 which is maintained in the holder 36 by spring biased washers 38 disposed on machine bolts 39 threaded into the mirror holder 36. The mirror holder 36 has secured thereto an auxiliary pressure plate 41 which is provided with a pair of ears 37 and 38 which are pivotally mounted on the aforementioned element 43.

As shown in Figure 18, a prestressed coil compression spring 45 is disposed between the element 43 and the pressure plate 41 to bias such pressure plate 41 in engagement with the manually adjustable screw 47, thereby allowing the mirror 15 to be properly aligned about the horizontal axis. For purposes of allowing manual adjustment about a vertical axis, the manually adjustable screw 50 is provided, such screw 50 being screw-threaded in the element 46 and engageable with the element 43. The prestressed coil compression spring 52 disposed between the elements 46 and 43 assures constant engagement of the element 43 with the screw 50. These adjustment screws 47 and 50 are used in the parallel adjustment to assure proper alignment of the plane of the mirror 15 such that the plane of the mirror 15 lies in a vertical plane. The mirror thus adjusted may be pivoted to positions indicated in Figure 19 for changing the convergence of the system using a mechanism involving the aforementioned manually adjustable arm 85 and rod 58 and now described in detail.

Figures 8, 9, 10, 11:
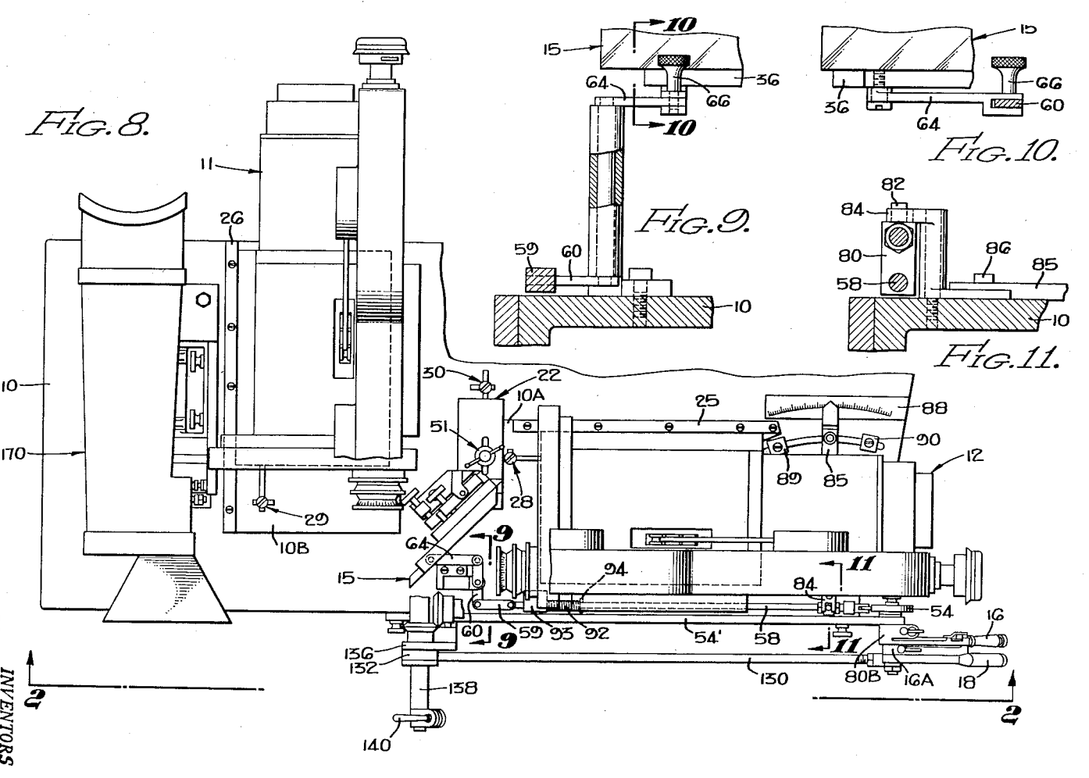
Figure 8 is a top plan view of the arrangement shown in Figure 2.
Figure 9 is a sectional view taken on the line 9—9 of Figure 8.
Figure 10 is a sectional view taken on the line 10—10 of Figure 9.
Figure 11 is a sectional view taken on the line 11—11 of Figure 8.

For that purpose, as shown in Figure 8, one end of the rod 58 is attached to one end of a connecting link 59, the other end of link 59 being pin connected to one end of the crank 60 (Figures 8 and 9). The crank 60 is supported for rotation about a vertical axis and the upper arm thereof is releasably secured to the arm 64 by means of a knurled fastening screw 66. Such arm 64 is pivotally secured to the mirror mounting. It is thus clear that longitudinal movement of rod 58 results in pivotal movement of the mirror 15 about the axis of the pivot pin 42 in the manner illustrated in Figure 19.

To allow the mirror support to be moved as described previously, in a direction parallel to the axis of camera 11 to any one of the adjusted positions indicated in Figure 22, the aforementioned mechanism and linkage involving the rod 58 and arm 85 is temporarily broken and, for this purpose, the locking knurled screw 66 is released. This locking screw 66, as shown in Figure 21, serves normally to lock one end of the crank 60 to the arm 64, but when such knurled screw 66 is released, pivotal movement between the arm 64 and crank 60 is permitted to allow movement of the mirror to any one of the adjusted positions illustrated in Figure 22, and once the mirror support is thus indexed with respect to one of the stop members on the stop turret 30, the knurled locking screw 66 is tightened to provide a rigid connection between the crank 60 on the one hand and the arm 64 on the other hand to thereby allow the angular position of the mirror to be adjusted in accordance with manual movement of the rod 58 and arm 85 attached thereto.

Figures 24, 25:
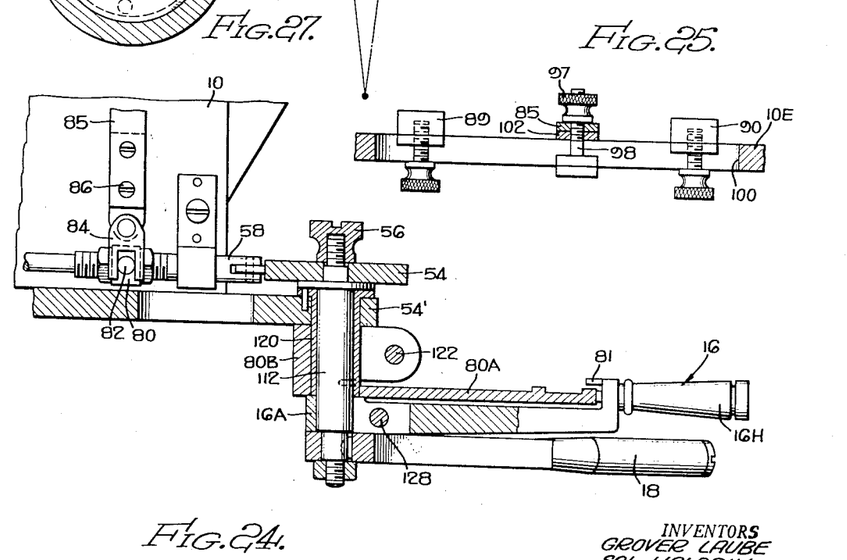
Figure 24 is a section taken substantially on the line 24—24 of Figure 2.
Figure 25 is a view taken generally on the line 25—25 of Figure 3.

The mirror adjustment rod 58, as shown in Figure 11, has secured thereto a plate 80 which in turn mounts a pin 82. This pin 82 is engageable with an apertured portion on one end of a crank 84 which is rotatably supported for movement about a vertical axis, and the lower end of such crank is pivotally secured to the actuating arm 85 serving also as a pointer 85 which, as shown in Figure 3, is pivoted about the pivot pin 86 to provide relatively large movement of the outer end of the pointer 85 cooperating with the stationary dial plate 88. Preferably, movement of this pointer 85 is limited by adjustable stop members 89 and 90 as shown in Figure 25. As shown in Figure 8, a spring 92 is provided to spring load the mirror adjustment mechanism, particularly for reasons appearing later. The prestressed coil compression spring 92 has one of its ends abutting the stationary guide 93 on the mounting plate and the other one of its ends abutting the pin 94 on rod 58 to normally tend to move the rod 58 to the right in Figure 8, but such movement may be prevented by locking the attached actuating arm 85 in a stationary position using the locking means shown in Figure 25 and comprising the knurled locking nut 97 which is threaded on the stud 98 on arm 85. The stud 98 extends through the arcuate slot 100 and the washer 102 is disposed between nut 97 and the edges of the raised stationary mounting plate 10E. This locking nut 97, however, is released when it is desired to change the angular position of the mirror with focusing of the cameras in the manner described presently using a mechanism which includes the cam 54 cooperating with a roller mounted on the right end of rod 58 as shown in Figure 8. It is understood that when it is desired to allow independent adjustment of the mirror and focusing, the cam 54 is removed and the mirror is adjusted and locked in adjusted position using the arrangements described above. For these general purposes, the cam 54 is removably mounted on its shaft as presently described.

As shown in Figure 24, the cam 54 is mounted on one end of shaft 112 by means of the knurled fastening screw 56, the shaft 112 being journalled for pivotal movement on the supporting plate 54' and having the actuating lever 18 keyed thereto.

For indicating purposes, auxiliary apparatus is concentrically mounted on the shaft 112 in releasably locked position and such apparatus includes a segment plate 80A and a cooperating pointer 81 on the lever 16.

The segment plate 80A having indicia thereon is supported on the stationary bushing 120 (Figure 24) and is locked thereto by the releasable locking lever 122 which has a threaded shank engageable with spaced halves of the segment plate bearing portion 80B for drawing the same together to thereby lock such bearing portion to the stationary bushing.

In a similar manner, the lever is provided with a split bearing portion 16A which may be locked to the shaft 112 using the releasable locking lever 128. Also, as shown in Figure 24, the lever 16 has a handle 16H which extends radially and is screw threaded on the lever 16 to engage the periphery of the segment plate 80A to allow such arm 16 to be locked to the segment plate and also to allow the actuating handle 18 to be locked in a predetermined position. The handle 18 is actuated to adjust the focusing of the cameras using the mechanism now described.

Figure 2:
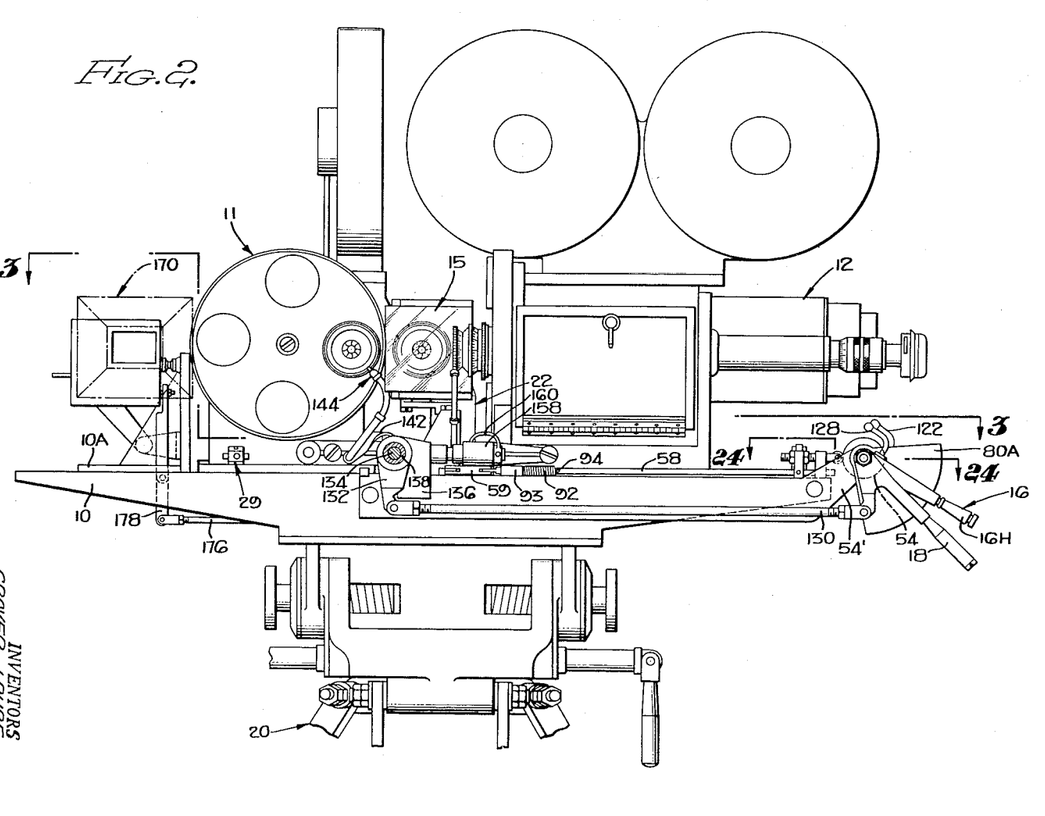
Figure 2 is a view looking in the direction from a scene which is to be photographed, and this view corresponds also to a view taken on the line 2—2 of Figure 8.
Figures 13, 14:
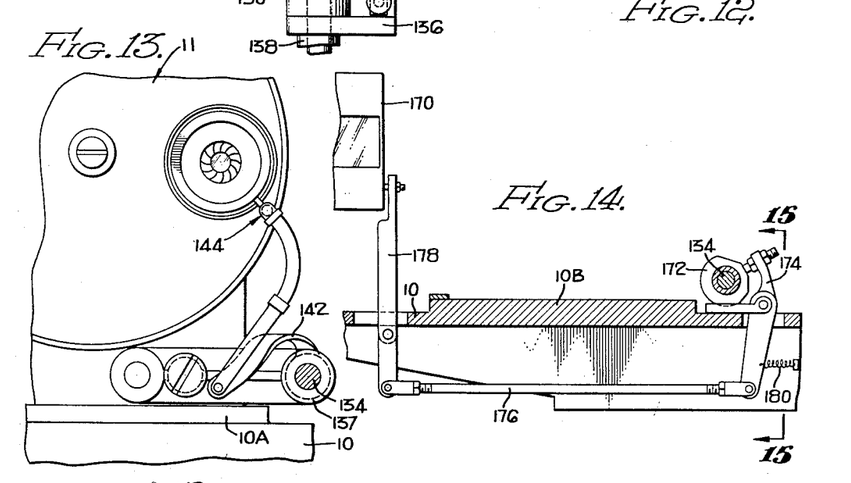
Figures 13 and 14 are sectional views taken on corresponding lines 13—13 and 14—14 of Figure 12.
Figure 15:
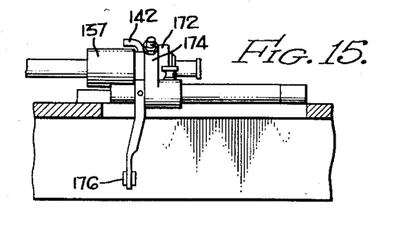
Figure 15 is a sectional view taken generally on the line 15—15 of Figure 14.

The lever 18 has one end of the rod 130 pin connected thereto, the other end of rod 130 being pin connected to a crank arm 132 mounted on an inner shaft 134 (Figures 2 and 3). The shaft 134 is rotatably supported on spaced bearing brackets 136, 137 and passes through the sleeve 138 having one end thereof split and provided with a threaded locking lever 140 for locking the outer sleeve 138 to the inner shaft 134 when it is desired to change the focusing of the two cameras simultaneously. As shown in Figure 13, the shaft 134 has a curved arm 142 secured thereto, which arm is pin connected to the conventional focusing mechanism 144 of camera 11. In a similar manner the focusing mechanism of the other camera 12 may be adjusted and for that purpose the sleeve 138 is provided with a bevel gear 150 which is in mesh with the bevel gear 152 on the rotatable shaft 154, such shaft 154 being journalled for rotation in the bearing 158 and carrying the curved arm 160 attached to the focusing mechanism 164 of the camera 12.

Thus, rotation of lever 18 results in focusing of camera 11; and when the outer sleeve 138 is locked to the inner shaft, focusing of cameras 10 and 11 occurs simultaneously.

Figure 12:
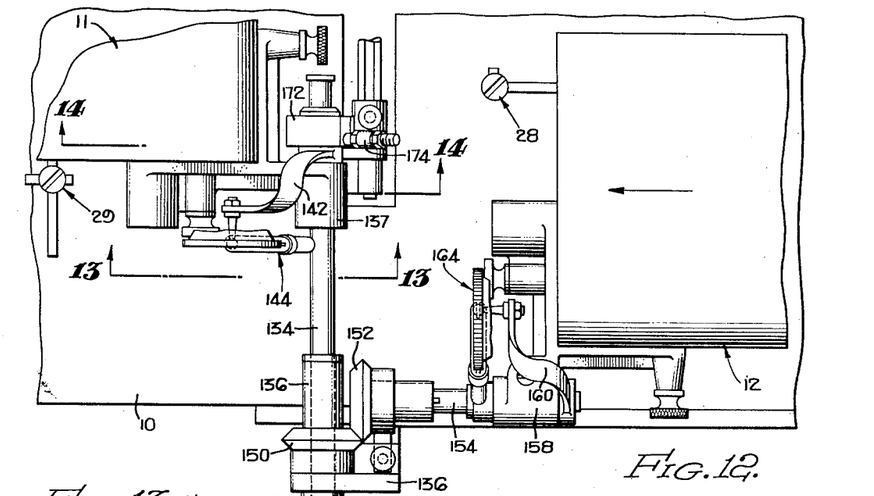
Figure 12 shows in enlarged form some of the apparatus illustrated in Figure 8 and serves to illustrate the manner in which the two focus controls of the individual cameras are mechanically inter-connected.

Adjustment of focusing causes also adjustment in the view finder 170. For this purpose, a cam 172 (Figures 12 and 14) is mounted on shaft 134 and cooperates with the cam follower arm 174 which is pivoted on the support 12 at a point intermediate its ends and with its lower end pin connected to one end of rod 176, the other end of rod 176 being pin connected to lever 178. Lever 178 is pivoted on support 12 at a point intermediate its ends and has its upper end attached to the view finder 170 so that the same may be moved laterally bodily upon adjustment of focusing of one or both cameras and also, under certain conditions, simultaneously with changing of convergence of the cameras. Conventional means may be used to spring bias the cam follower arm 174 into engagement with the cam 172 and such means may, for example, be a coil tensioned spring 180 (Figure 14) having one of its ends attached to the lever 174 and the other one of its ends attached to a stationary bracket on the main support.

A feature of the present arrangement, as alluded to above, resides in offcentering the lenses 11A and 12A in the cameras 11 and 12 as shown in Figure 23. Such offset is measured in terms of the angles A and B, respectively, which are the angles defined by two lines, i. e., one line perpendicular to the image planes 11P and 10P, respectively (the plane of the film) and the other line passing through the center of the corresponding lens and the center of such image plane. Both of these angles thus defined extend inwardly to provide convergence. Preferably, most of the desired convergence in the system is accomplished by thus offsetting the lenses 11A and 11B to produce the above-mentioned small separation of disparate images with only slight, if any, convergence being provided by the mirror 15.

The mirror arrangement is used mainly to obtain small interocular distances between camera axes, in the order of two and one half inches and smaller, a result which cannot be achieved when the size of the cameras is large and do not provide the proper spacing between optical axes.

One important concept thus is that convergence in the system is accomplished by an adjustment as close as practical to the image plane, i. e., at the lenses themselves.

The lens 11A and 11B for these general purposes may be made adjustable to provide adjustment of convergence. Thus, as shown in Figure 26, the lenses 11A and 11B are each disposed in a cylindrical externally threaded cylinder 190, which lens has its principal axis eccentrically located with respect to the axis of the internally threaded holder 191, so that rotation of the cylinder 190 within the holder 191 results in change in the angle A or B, as the case may be, in the horizontal plane. This expedient thus allows the lens 11A and 11B to be effectively shifted laterally in a horizontal plane and laterally with respect to the plane of the image plane 11P (or 10P).

Outward and inward movement of the lenses 11A, 12A thus adjusted, further and closer to the image plane is accomplished using conventional means actuated as described previously by moving arm or lever 18.

It has been found that, once the lenses 11L and 10L have been thus adjusted for proper convergence, little or no adjustment is thereafter required in shooting different scenes in a motion picture.

Thus, in operation, the lenses 11L and 10L are offset as indicated in Figure 23 to provide the major portion of the convergence in the system. The mirror 15 may be adjusted independently by first removing the cam 54, unlocking arm 85 and moving it to an adjusted position wherein the proper convergence is obtained for a given focused condition of the cameras; and pictures may thus be taken. However, when different pictures are taken with different focusing of the lenses, the angle of the mirror is simultaneously and automatically changed and for that purpose the cam 54 is placed in operative condition as shown in Figure 3 with the arm 85 unlocked so that the mirror 15 may be moved upon movement of lever 18. Under this latter condition, the locking lever 140 is in locked position to cause simultaneous movement of the two shafts 134 and 154 to change the focusing of both cameras simultaneously; and also the view finder 170 is moved laterally. The cameras 10 and 11 are both of conventional type, except for the offsetting of the optical axes of the lenses 10L and 11L, respectively, in which a plurality of lenses mounted in an adjustable turret is provided, with such turret being movable to bring a selected lens in properly aligned position.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In an arrangement of the character described, a pair of cameras each having their image planes extending substantially perpendicularly, a common supporting base for said cameras, each of said cameras having planar film therein, the plane of which defines said image plane, each of said cameras comprising a light tight box with a cylindrical opening therein through which light may enter and impinge on said film, a lens holder rotatably mounted in said cylindrical opening, the axis of said cylindrical opening extending perpendicular to said image plane, a lens mounted on said holder with the principal axis of said lens off-centered with respect to said axis whereby rotation of said holder in said opening changes the angle of incidence defined by said principal axis and said plane, a focusing lens for each camera having the central optical axis thereof making an acute angle with respect to the normal of the corresponding image plane, and a tiltable mirror disposed on said base between said cameras for projecting the optical axis of one of the cameras to a remote point of convergence with the optical axis of the other camera.

2. In an arrangement of the character described, a pair of cameras having their image planes substantially at right angles to each other, a common supporting base for said cameras, each of said cameras having planar film therein, the plane of which defines said image plane, each of said cameras comprising a light tight box with a cylindrical opening therein through which light may enter and impinge on said film, a lens holder rotatably mounted in said cylindrical opening, the axis of said cylindrical opening extending perpendicular to said image plane, a lens mounted on said holder with the principal axis of said lens off-centered with respect to said axis whereby rotation of said holder in said opening changes the angle of incidence defined by said principal axis and said plane, means for jointly adjusting the focusing of both cameras, a mirror disposed on said base between said cameras for converging the principal axes of said cameras, and means for automatically changing the position of said mirror in a predetermined manner in accordance with adjustment of the focusing of said cameras.

3. In an arrangement of the character described, a pair of cameras having their image planes substantially at right angles to each other, at least one of said cameras having a lens system the principal axis of which makes an acuate angle with the normal of the corresponding image plane, a common supporting base for said cameras, each of said cameras having planar film therein, the plane of which defines said image plane, each of said cameras comprising a light tight box with a cylindrical opening therein through which light may enter and impinge on said film, a lens holder rotatably mounted in said cylindrical opening, the axis of said cylindrical opening extending perpendicular to said image plane, a lens mounted on said holder with the principal axis of said lens off-centered with respect to said axis whereby rotation of said holder in said opening changes the angle of incidence defined by said principal axis and said plane, a mirror disposed on said base between said two cameras for converging the principal axes of both cameras, means for jointly controlling the focusing of both cameras, and means operatively associated with the last mentioned means for changing the position of said mirror in accordance with forcusing of said cameras.

4. The arrangement set forth in claim 3, including a view finder, and means for changing the posiiton of said view finder in accordance with adjustment of the focusing of the cameras.

5. In an arrangement of the character described, a substantially horizontal mounting plate, a pair of cameras slidably mounted on said plate in a direction corresponding to their particular optical axes, the optical axes of said cameras being disposed approximately at right angles to each other, each of said cameras having planar film therein, the plane of which defines an image plane, each of said cameras comprising a light tight box with a cylindrical opening therein through which light may enter and impinge on said film, a lens holder rotatably mounted in said cylindrical opening about the axis thereof, the axis of said opening extending perpendicular to said image plane, a lens mounted on said holder with the principal axis of said lens offset with respect to said axis whereby rotation of said holder in said opening changes the angle of incidence defined by said principal axis and said plane, an adjustable stop turret for each of said cameras having a plurality of stop members extending therefrom and engageable with a corresponding one of said cameras to index the same in a predetermined position, a plane mirror slidably mounted on said plate in a direction substantially parallel to the optical axis of one of said cameras, said mirror having its plane making an angle of substantially 45° with respect to the optical axis of the other of said pair of cameras, an adjustable stop turret for said mirror having a plurality of stop members extending therefrom for limiting slidable movement of said mirror to thereby index the same.

6. In an arrangement of the character described, a pair of cameras each having their optical axes extending generally at right angles to each other, a common supporting base for said cameras, each of said cameras having planar film therein, the plane of which defines said image plane, each of said cameras comprising a light tight box with a cylindrical opening therein through which light may enter and impinge on said film, a lens holder rotatably mounted in said cylindrical opening, the axis of said cylindrical opening extending perpendicular to said image plane, a lens mounted on said holder with the principal axis of said lens off-centered with respect to said axis whereby rotation of said holder in said opening changes the angle of incidence defined by said principal axis and said plane, a plane mirror on said base having its plane extending at an angle of substantially 45° with respect to the optical axis of one of said cameras and intersecting the last-mentioned optical axis, a mechanism comprising a manually adjustable member for moving said mirror to cause the plane thereof to make different angles with said last-mentioned optical axis, a mechanism coupling a second manually adjustable member for changing the focusing jointly of said cameras, and means for interconnecting the first and second mentioned mechanisms for joint operation.

References Cited in the file of this patent

UNITED STATES PATENTS

| | | |
|---|---|---|
| 765,980 | Mercier | July 26, 1904 |
| 852,476 | Verbeck | May 7, 1907 |
| 1,595,984 | Ames | Aug. 17, 1926 |
| 1,840,861 | Walker | Jan. 12, 1932 |
| 2,153,892 | Jackman | Apr. 11, 1939 |
| 2,337,363 | Ames | Dec. 21, 1943 |
| 2,365,212 | Oriol | Dec. 19, 1944 |
| 2,630,737 | Ramsdell | Mar. 10, 1953 |
| 2,753,774 | Norling | July 10, 1956 |

FOREIGN PATENTS

| | | |
|---|---|---|
| 277,492 | Italy | Sept. 10, 1930 |
| 607,572 | Germany | Jan. 2, 1935 |
| 850,405 | France | Sept. 11, 1939 |
| 693,174 | Great Britain | June 24, 1953 |